United States Patent Office 3,806,464
Patented Apr. 23, 1974

3,806,464
PIGMENT ENCAPSULATED WITH AN ACRYLIC INTERPOLYMER
Howard Matrick, Springfield, N.J., and David W. Zunker, Wilmington, Del., assignors to E. I. du Pont de Nemours and Company, Wilmington, Del.
No Drawing. Filed Apr. 5, 1972, Ser. No. 241,460
Int. Cl. B01j 13/02; B44d 1/02
U.S. Cl. 252—316         4 Claims

ABSTRACT OF THE DISCLOSURE

A particulate composition is composed of organic pigment particles encapsulated with an acrylic interpolymer. The acrylic interpolymer consists essentially of, by weight, 25 to 95% ethyl methacrylate, 5 to 75% of an acrylic monomer selected from the group consisting of n-butyl methacrylate, n-butyl acrylate, 2 - ethylhexyl methacrylate, and 2-ethylhexyl acrylate, and 0.5 to 10% of an ethylenically unsaturated acid selected from the group consisting of acrylic acid, methacrylic acid, and itaconic acid, the acrylic interpolymer having an inherent viscosity of 0.1 to 0.6. The particulate compositions have special utility as pigments for acrylic type automotive finishes, especially those providing a metallic finish.

BACKGROUND

Colored pigments are widely used in various types of polymeric media. The efficiency with which the pigments may be used as coloring materials in such applications is largely dependent upon the degree to which the pigments may be dispersed and remain in a finely dispersed condition in the finished product. In many cases, although the pigments may be dispersed by means of, for example, hard and repeated milling of polymer and pigment, agglomeration of the pigment may nonetheless subsequently occur with a resultant loss in properties.

The problem of pigment agglomeration can be especially severe in the case of automotive enamels and lacquers based upon solvent solutions of acrylic polymers and containing metal particles, i.e. aluminum flake, to provide a metallized or "poly-chromatic" finish. These finishes provide rich, glamorous, decorative effects due to their apparent enhancement of curvature. The phenomenon is known as geometric metamerism, but more commonly is referred to in the automotive industry as "two-tone" effect or "flip-flop." It is observable as a change in color depth, and often hue, as a function of viewing angle. This is apparent on an automobile by comparing the appearance of different body contours. On a flat surface, the effect may be observed by slowly rotating a paint panel from a normal to an obtuse angle. The color should increase in depth as the viewing angle changes in any direction from the normal. In any case the effect, which is caused by specular reflection of the flake pigment, is diminished if the colored pigment scatters light diffusely. The so-called "transparent" pigments, then, are those which are free from particles large enough to cause diffuse scattering. To be suitably transparent an organic pigment should generally have crystallite sizes less than $0.1\mu$ and should resist particle agglomeration during the various phases of pigment manufacture and during formation of the finish itself.

SUMMARY OF THE INVENTION

In accordance with the invention there is provided a particulate composition composed of organic pigment particles encapsulated with an acrylic interpolymer, said acrylic interpolymer consisting essentially of, by weight, 25 to 95% ethyl methacrylate, 5 to 75% of an acrylic monomer selected from the group consisting of n-butyl methacrylate, n-butyl acrylate, 2 - ethylhexyl methacrylate, and 2-ethylhexyl acrylate, and 0.5 to 10% of an ethylenically unsaturated acid selected from the group consisting of acrylic acid, methacrylic acid, and itaconic acid, said acrylic interpolymer having an inherent viscosity of 0.1 to 0.6.

DETAILED DESCRIPTION

The particulate compositions of the present invention are highly compatible with the solvents and acrylic polymers typically used in the manufacture of present day automotive finishes, and usually may be stirred directly into the finish composition without milling. Because individual pigment particles have been encapsulated with the acrylic interpolymer, there is virtually no tendency for the pigment particles to agglomerate together when they are incorporated into the finish composition. Although the acrylic interpolymer coating about the particles may be largely or completely dissolved in the final finish composition, the particles are by that time in a sufficient degree of dispersion that agglomeration is minimized. Paint films formed of the novel encapsulated pigments will exhibit a high degree of transparency and "two-tone" effect. In these respects they will tend to compare most favorably with similar paint films made from pigment particles containing no such acrylic interpolymer.

The encapsulation of the organic pigment particles to produce the particulate compositions of the invention can be performed in various ways. Conveniently the pigment and acrylic interpolymer will be milled together, e.g. in a ball mill, sand mill or the like, along with sufficient solvent to dissolve at least a portion of the polymer and thereby coat the individual particles in the process. Subsequently the solvent is then removed, e.g. by steam distillation, the particles dried and then ground as necessary. A polymer solvent is not essential, however, as it is also entirely practical to use an emulsion of the polymer and an aqueous milling operation.

The relative proportions of pigment and acrylic interpolymer may be varied widely depending upon the intended use of the encapsulated pigment. As little as 1% by weight of the interpolymer has been found to give a distinct beneficial effect in many paint systems. In these or other applications it will not be detrimental to have a large amount of interpolymer since it will nonetheless remain to serve as a binder in the final product. From the standpoint of convenience it is usually preferred to operate with about 10 to 99% by weight of pigment based upon the weight of encapsulated pigment. Solvents that may be employed in preparing the particulate compositions are acetone, ethanol, n-propyl alcohol, isopropyl alcohol, secondary butyl alcohol, and dioxane. Other solvents that may be used are water, ethyl acetate, n-propyl acetate, isopropyl acetate, 2-nitropropane, tetrachloroethylene, ortho-dichlorobenzene and the like. If desired, other additives such as stabilizers, antioxidants, and the like may be incorporated with the acrylic interpolymer when it is coated onto the pigment particles.

The organic pigments employed in the practice of the invention must be substantially insoluble in the usual acrylic polymer solvents but otherwise may be of a wide variety. The copper phthalocyanines of the polychloro-, polybromo-, partially chlorinated, and chlorine-free types are particularly useful. Similarly $\gamma$ or $\beta$-crystal-phase quinacridone may be used as well as substituted quinacridones, such as 2,9 - dimethyl, 2,9 - dichloro, 2,9-difluoro, 2,9-dimethoxy- and 4,11 - dichloro-quinacridones. It is considered also within the scope of the invention to employ solid-solution quinacridone pigments, such as, for example, those of U.S. Pat. 3,650,510. Other pigments that may be employed include Toluidine Red, Benzidine Yellow, Thioindigo Red, azo yellows, Permanent Red, Watchung Red, and Flavanthrone Yellow.

As will be apparent from the examples hereinafter, it is frequently advantageous to subject the pigment to a preliminary grinding procedure in the absence of the acrylic interpolymer. In this way the particles are reduced to a fine state of subdivision, usually of a particle size less than $0.1\mu$, and in addition the particles may become more amorphous in nature.

The acrylic interpolymers employed in this invention consist essentially of three components; namely (1) ethyl methacrylate, (2) an acrylic monomer selected from the group consisting of n-butyl methacrylate, n-butyl acrylate, 2-ethylhexyl methacrylate and 2-ethylhexyl acrylate, and (3) an ethylenically unsaturated acid selected from the group consisting of acrylic acid, methacrylic acid and itaconic acid.

The acrylic interpolymer should contain about 25 to 95% by weight of ethyl methacrylate, preferably about 45 to 75% of ethyl methacrylate.

The second essential component of the acrylic interpolymer is about 5 to 75% by weight of an acrylic monomer selected from the group consisting of n-butyl methacrylate, n-butyl acrylate, 2-ethylhexyl methacrylate and 2-ethylhexyl acrylate. Mixtures of these monomers may be used. Preferably, the interpolymer contains about 25 to 55% of this monomer. The preferred monomer is n-butyl methacrylate.

The third essential component of the acrylic interpolymer is about 0.5 to 10% by weight of ethylenically unsaturated acid selected from the group consisting of acrylic acid, methacrylic acid and itaconic acid. A mixture of these acids can be used. Preferably, the interpolymer contains about 1 to 5% of the acid component. The preferred acid is acrylic acid.

The acrylic interpolymer should have an inherent viscosity of about 0.1 to 0.6, and preferably a viscosity of about 0.2 to 0.35. The inherent viscosities referred to herein are measured at 25 °C. using 250 milligrams of the interpolymer in 50 cubic centimeters of chloroform.

The acrylic interpolymers herein are, as previously indicated, highly advantageous in terms of their compatibility with a wide variety of acrylic resin-based coatings including thermosetting enamels, thermoplastic lacquers and non-aqueous dispersions. The interpolymers are also compatible with nonacrylic paint systems, with plastics such as acrylic polymers, polyvinyl chloride and polystyrene, and with printing ink systems such as nitrocellulose. They are further advantageous in having a relatively high softening point, i.e. so that encapsulated pigment particles can be dried without undesired sticking.

The method of preparing the acrylic interpolymer is not critical. It is most convenient to prepare this interpolymer by the familiar solution polymerization technique using a suitable solvent. One suitable technique, resulting in a terpolymer of about 59% ethyl methacrylate, 39% n-butyl methacrylate, and 1.5% acrylic acid (all percentages being on a weight basis) is as follows:

A four-liter resin kettle equipped with an agitator, addition funnel, reflux condenser, thermometer and nitrogen purge is charged with 600 g. of ethyl methacrylate, 400 g. of n-butyl methacrylate, 15 g. of acrylic acid, 2.0 g. of n-dodecyl mercaptan chain-transfer agent and 1120 g. of n-propyl acetate solvent. The mixture is agitated and heated to 93° C. and then a solution of 6.0 g. of azobisisobutyronitrile free-radical initiator in 400 g. of n-propyl acetate is added at the rate of 5.0 ml. per minute for 75 minutes. The temperature is maintained at 92–94° C. After 75 minutes, initiator flow is stopped and the reaction mixture is held at 92–94° C. for 15 minutes. Then the balance of the initiator solution is added all at once and the reaction temperature is maintained at 96–98° C. for 60 minutes. At the end of this final period the solution polymer is cooled and discharged.

Brookfield viscosity of the 40% solids solution resin in n-propyl acetate is 150 cps. The inherent viscosity of the resin isolated by thorough solvent evaporation is 0.25, measured as 0.25 g. polymer in 50 ml. chloroform at 25° C. using a No. 50 Cannon-Fenske viscometer. The isolated resin issoluble in both 95% and absolute ethyl alcohol, and 40% solids solutions are clear and colorless.

Where it is desired to encapsulate the pigment by means of an aqueous milling operation, it may be preferable to prepare the terpolymer by a standard emulsion polymerization technique and to use it in the emulsion form.

The invention will be further described in the following examples, in which all parts and percentages are by weight unless otherwise indicated. Although reference is made in the examples to the preparation of automotive finishes of the thermosetting acrylic type, it will be understood that important advantages of the invention are likewise attained in the production of acrylic lacquers, i.e. thermoplastic lacquers, as well. Similarly it will be understood that the utility of the novel particulate compositions of the invention is not to be confined to use in automotive finishes as it is also practical to employ the materials for purposes of pigmenting other types of finish compositions, inks, plastics, and fibers.

EXAMPLE I (a) Polychloro copper phthalocyanine is prepared according to the following procedure:

A metal autoclave, equipped with an agitator and capable of withstanding pressure of 40–50 atmospheres, is charged with the following ingredients:

327 parts of copper phthalocyanine
33 parts anhydrous cupric chloride
327 parts anhydrous aluminum chloride
3900 parts of sulphur dichloride The autoclave is closed and the temperature raised to 180° C. giving a pressure of 265 lbs./sq. in. The autoclave is vented at 265 p.s.i. and the heating continued for a period of four hours. Then the pressure in the autoclave is reduced to atmospheric and the sulfur dichloride recovered by passing a stream of chlorine gas through the reactant mixture. The product is dry crude polychloro copper phthalocyanine aluminum chloride complex.

One hundred eighty-two parts of the crude powder is slurried in about 2000 parts of water with good agitation until a uniform slurry results. The slurry is then heated to boil, stirred for a short time at the boil, filtered, and washed free of soluble salts. The pigment is dried at 80° C. and micropulverized.

(b) An 8 oz. jar is charged with the following materials:

600 grams ⅛″ steel shot
12 grams of the crude polychloro copper phthalocyanine product of (a)
1.2 grams sodium nitrite
1.2 grams trisodium phosphate decahydrate
79.0 grams acetone
8.0 grams of a terpolymer of about 59% ethyl methacrylate, 39% buytl methacrylate, and 1.5% acrylic acid.

The mill is rotated at 75% of the critical speed for 68 hours. The mill is discharged using sufficient additional acetone to collect all of the pigment slurry from the mill. Steam is passed through the slurry until the temperature reaches 95° C., at which time all of the acetone is removed. At this point a solution of 26 grams of concentrated sulfuric acid in 333 grams of water is added, and the resultant green slurry heated at 95° to 100° C. for ½ hour. The product is collected by filtration, washed free of acid, dried at 80° C., and micropulverized.

Using a standard sand milling procedure, the pigment prepared as above is dispersed in an automotive thermosetting acrylic enamel of the metallized type, i.e. employing a mixture of 90% of the terpolymer-encapsulated organic pigment and 10% aluminum flake. When applied as a paint film to a metal surface, the pigment of the invention exhibits a dramatic "two-tone" effect to a much greater degree than a paint film prepared in an identical manner but using a commercially available polychloro copper phthalocyanine (Color Index No. 74260) without the terpolymer.

EXAMPLE II (a) A polybromo copper phthalocyanine pigment is prepared as follows: The following ingredients are melted, using an oil bath:

| | Parts |
|---|---|
| Aluminum chloride | 450 |
| Sodium chloride | 110 |
| Cuprous chloride | 20 |
| Copper phthalocyanine (crude) | 60 |

When the temperature reaches 200–210° C., liquid bromine is bubbled through the melt for a period of five hours. The melt is then drowned in 35 parts of boiling water containing 200 parts of 37% hydrochloric acid. The polybromo copper phthalocyanine pigment thus precipitated is filtered and washed with 4000 parts of 1% hydrochloric acid solution, and then water-washed free of acid. Analysis of the product shows that it contains 11 bromine atoms and three chlorine atoms per molecule of copper phthalocyanine. The pigment is dried at 80° C. and micropulverized.

(b) A ball mill of 58 gallon capacity is charged with the following materials:

938 pounds ⅛″ steel shot
26.4 pounds of the polybromo copper phthalocyanine pigment prepared in (a)
16.4 pounds of the terpolymer employed in Example I
130 pounds acetone Following the procedure described in Example I, the ball mill is rotated at 75% critical speed for 48 hours. The mill is discharged, the acetone and pigment recovered, and an automotive enamel prepared as described in Example I. A remarkable finish is obtained exhibiting a much more pronounced "two-tone" effect than enamel prepared in a similar manner but using a commercial polybromo copper phthalocyanine in place of the product of this example.

EXAMPLE III (a) The following materials were charged to a ball mill:

18 parts of crude copper phthalocyanine pigment containing about 4.0% chlorine, and about 0.27% sulfur, obtained by reaction of 4 - chlorophthalic acid, 4-sulfophthalic acid and phthalic anhydride with urea and copper chloride in kerosene, and in the presence of ammonium molybdate.
1000 parts of steel rods ⅝″ x 1″.

The ball mill is rotated at about 70% critical speed for six hours, then discharged from the mill through a screen and the pigment recovered.

(b) A ball mill of 8 oz. capacity is charged with the following materials:

600 grams ⅛″ steel shot
12.0 grams of the crude partially chlorinated copper phthaocyanine prepared in (a)
8.0 grams of the same terpolymer employed in Example I
79 grams acetone The ball mill is rotated for 68 hours and the pigment finished and incorporated in an automotive enamel with 10% flake aluminum as described in Example I. Paint films of the enamel exhibit a remarkable degree of transparency and depth of color. In these respects the enamel is notably superior to a similarly prepared enamel but in which the terpolymer encapsulation is omitted.

EXAMPLE IV

This example illustrates the preparation of samples at both the 1% and 10% terpolymer levels.

To each of two one-quart containers is charged:

| | Grams |
|---|---|
| ½″ steel balls | 1500 |
| Roofing nails | 150 |
| Aluminum sulfate-octadecahydrate | 135 |
| Crude chlorine-free phthalocyanine | 15 |
| Tetrachloroethylene | 4.0 |

To prepare the sample which will ultimately contain 10% resin, 1.85 grams of the terpolymer of Example I is added to one container. To prepare the sample which will contain 1% resin, 0.17 gram of terpolymer is added to the other container. The mill charges are each then ball milled for 66 hours at 75% of critical speed. The balls and nails are separated and each of the dry powders is added separately to a solution of:

2000 grams $H_2O$
81 grams of concentrated sulfuric acid
1.67 grams of copper phthalocyanine monosulfonate, sodium salt (to modify the rheological properties).

The slurries are each heated to 95–100° C., held 2 hours, filtered, and washed free of sulfate ion. The products are dried and pulverized.

Nitrocellulose inks of these materials are prepared by standard ball milling procedures. The product with 1% terpolymer shows greater transparency (lack of scattering) over aluminum foil than a sample prepared in an identical manner but without the terpolymer. The product with 10% terpolymer shows even greater transparency in nitrocellulose ink than the material containing 1% terpolymer.

EXAMPLE V (a) The following materials are charged to a water-jacketed ball mill:

1000 parts steel rods ⅝″ x 1″
20 parts of crude β-phase quinacridone
1 part of tetrachloroethylene.

The mill is rotated at about 75% of critical speed for a period of 60 hours with water at 90–100° C. circulating in the jacket. At the conclusion of this time, the dry powder is discharged from the mill and recovered.

(b) an 8 oz. capacity ball mill is charged with the following materials:

600 grams of 8″ steel shot
11.4 grams of β-phase quinacridone pigment prepared in (a)
14.7 grams of the terpolymer as described in Example I
79 grams acetone The procedure given in Example I is carried out through the preparation of an automotive enamel. The enamel shows exceptionally good metallic "two-tone" effect when compared with a metallic automotive finish prepared using a pigment prepared in a like manner, but without the terpolymer.

EXAMPLE VI (a) To 1000 parts of 98% $H_2SO_4$ are added:

60 parts linear quinacridone, and
40 parts quinacridonequinone

The resultant mixture is stirred at 5–10° C. until solution is complete. This solution is then introduced continuously through a small orifice into the center of a stream of cold water flowing under pressure through a constricted tube in a state of turbulent flow. The ratio of $H_2O$ to $H_2SO_4$ is about 10 to 1 and the temperature rise is about 15° C. The resulting strongly acid slurry is heated to about 70° C. and held at 70–80° C. for about two hours. The solid is filtered, washed acid-free and dried at 60° C. to give 100 parts of a dark red powder. An X- ray diffraction pattern of the product indicates the formation of a solid solution of quinacridone in quinacridonequinone.

(b) The following materials are charged to an 8 oz. jar mill:

600 grams of 1/8" shot
5.7 grams of the solid solution of quinacridone and quinacridonequinone prepared in (a)
0.3 gram of ortho-carboxybenzamidomethyl quinacridone (prepared per Example I of U.S. 3,275,637)
14.0 grams of the terpolymer of Example I
79 grams acetone The procedure of Example I is carried out through the preparation of an automotive finish. It shows excellent "two-tone" characteristics.

EXAMPLE VII

Crude polychloro copper phthalocyanine as prepared in Example I is used directly as an aqueous press cake as follows:

An 8 oz. container is charged with:

600 grams 1/8" steel shot
12 grams crude chlorinated copper phthalocyanine press cake (dry basis)
8 grams of a terpolymer (dry basis). The terpolymer composition is the same as that employed in Example I but in this case is prepared by emulsion polymerization
5.3 grams of 50% sodium hydroxide
Sufficient water so that the total water content from all sources is 100 grams.

The ball mill is rotated 66 hours at 180 r.p.m. The pigment slurry is separated from the shot and 3.9 grams of orthodichlorobenzene and 0.38 grams of a hydrogenated rosin solution in ortho-dichlorobenzene (28%) is added. The ortho-dichlorobenzene is distilled as rapidly as possible using sparger steam. The product is collected by filtration, washed base free, dried at 80° C. and pulverized. When dispersed in thermosetting acrylic enamel it gives metallic finishes with an attractive dark "two-tone" effect.

What is claimed is:

1. A particulate composition composed of organic pigment particles encapsulated with an acrylic interpolymer, said acrylic interpolymer consisting essentially of, by weight, 25 to 95 percent ethyl methacrylate, 5 to 75 percent of an acrylic monomer selected from the group consisting of n-butyl methacrylate, n-butyl acrylate, 2-ethylhexyl methacrylate, and 2-ethylhexyl acrylate, and 0.5 to 10 percent of an ethylenically unsaturated acid selected from the group consisting of acrylic acid, methacrylic acid, and itaconic acid, said acrylic interpolymer having an inherent viscosity of 0.1 to 0.6, measured at 25° C. using 250 mg. of the interpolymer in 50 cc. chloroform.

2. The particulate composition of claim 1 wherein the acrylic interpolymer consists essentially of 45 to 75% ethyl methacrylate, 25 to 55% n-butyl methacrylate and 1 to 5% acrylic acid.

3. The particulate composition of claim 1 wherein the organic pigment is a halogen-containing copper phthalocyanine pigment.

4. The particulate composition of claim 1 wherein the organic pigment is a quinacridone pigment.

References Cited

UNITED STATES PATENTS

| 3,133,893 | 5/1964 | Newman | 260—41 C |
| 3,070,564 | 12/1962 | Roeser | 260—80.8 X |
| 3,437,503 | 4/1969 | Massam et al. | 106—308 M X |
| 3,418,295 | 12/1968 | Schoenthaler | 260—80.8 X |

RICHARD D. LOVERING, Primary Examiner

U.S. Cl. X.R.

117—100 A; 252—314; 260—17 R, 32.8 A, 33.8 UA, 41 B, 41 C